US00RE48508E

(19) United States
(12) Reissued Patent
Waitesmith

(10) Patent Number: US RE48,508 E
(45) Date of Reissued Patent: Apr. 13, 2021

(54) COSMETIC BRUSH

(71) Applicant: ARTIS LLC, Jersey City, NJ (US)

(72) Inventor: Matthew Waitesmith, Jersey City, NJ (US)

(73) Assignee: Artis LLC, Jersey City, NJ (US)

(21) Appl. No.: 29/723,878

(22) Filed: Feb. 11, 2020

Related U.S. Patent Documents

Reissue of:
(64) Patent No.: Des. 699,041
Issued: Feb. 11, 2014
Appl. No.: 29/425,384
Filed: Jun. 22, 2012

U.S. Applications:
(60) Division of application No. 29/650,930, filed on Jun. 11, 2018, now Pat. No. Re. 47,847, which is an application for the reissue of Pat. No. Des. 699,041, and a division of application No. 29/554,344, filed on Feb. 10, 2016, now Pat. No. Re. 46,939, and a
(Continued)

(51) LOC (13) Cl. ..... 04-02
(52) U.S. Cl.
USPC ..... D4/138; D4/104; D4/134
(58) Field of Classification Search
USPC ..... D4/104, 105, 106, 107, 109, 111, 112, D4/132, 134, 136, 138
CPC ..... A46B 5/02; A46B 11/0003; A46B 5/026; A46B 9/04
See application file for complete search history.

(56) References Cited

U.S. PATENT DOCUMENTS 1,193,287 A * 8/1916 Morgan ..... 15/188
1,647,453 A 11/1927 Krantz
(Continued)

FOREIGN PATENT DOCUMENTS

CN 201453625 U * 5/2010

OTHER PUBLICATIONS

GB 2051937 Registered Design Application, (La Brosse et Dupont SA) Mar. 18, 1996, [online], [retrieved on Nov. 21, 2012] Retrieved from the Design Database of the Intellectual Property Office of the United Kingdom using the Internet: <URL: http://www.ipo.gov.uk>.*
(Continued)

*Primary Examiner* — Philip S Hyder
(74) *Attorney, Agent, or Firm* — Leason Ellis LLP

(57) CLAIM

The ornamental design for a cosmetic brush, as shown and described.

DESCRIPTION

[FIG. 1 is a top perspective view of a cosmetic brush showing my new design.]
[FIG. 2 is a top view of a cosmetic brush showing my new design; and,]
[FIG. 3 is a first side view of a cosmetic brush showing my new design.]
*FIG. 4 is a top view of a cosmetic brush showing a first embodiment my new design;*
*FIG. 5 is a side view thereof; and,*
*FIG. 6 is a bottom view thereof.*
The ornamental design which is claimed is shown in solid lines in the drawings. The broken lines in the drawings are for illustrative purposes only and form no part of the claimed design.

1 Claim, 4 Drawing Sheets

Figure 1:
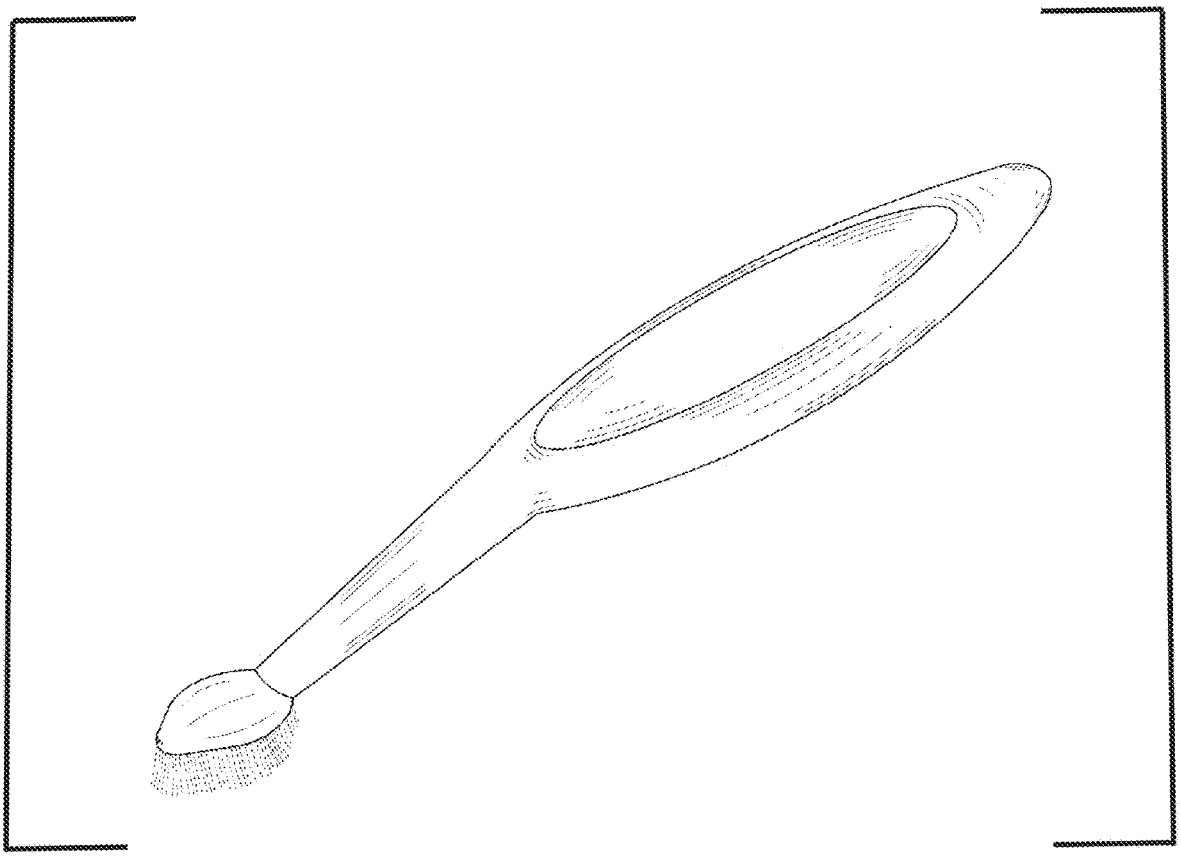
Figure 2:
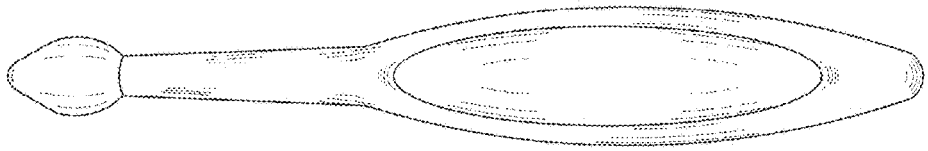
Figure 3:
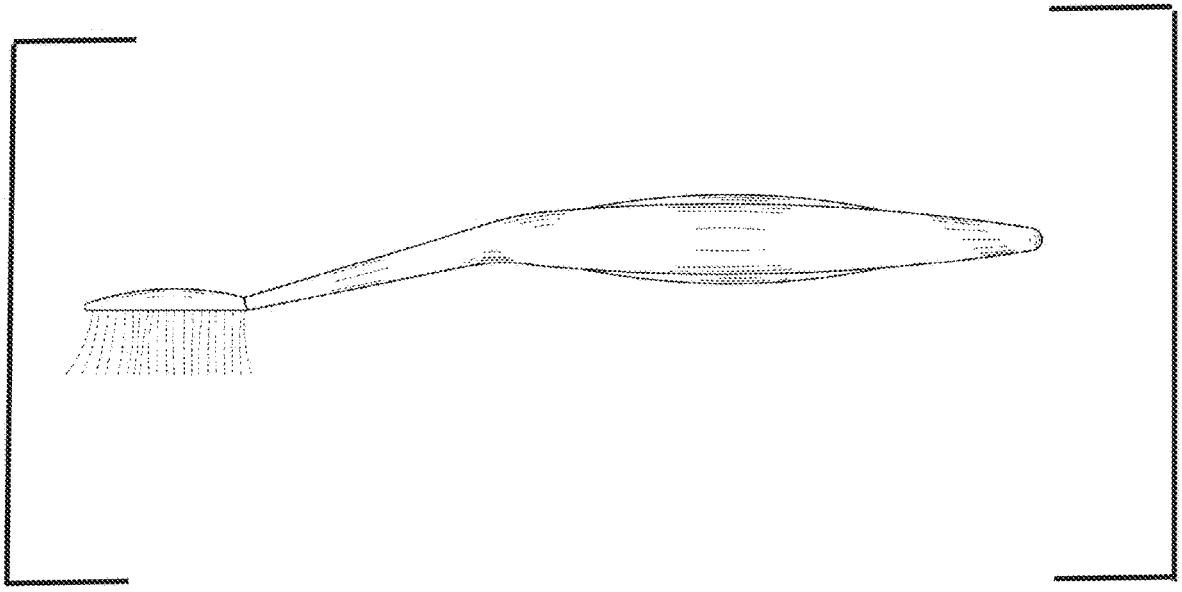

Matter enclosed in heavy brackets [ ] appears in the original patent but forms no part of this reissue; matter printed in italics indicates the additions made by reissue.

NEW

NEW

Related U.S. Application Data continuation of application No. 12/425,182, filed on Apr. 16, 2009, now abandoned.

(56) References Cited

U.S. PATENT DOCUMENTS

| | | | | | |
|---|---|---|---|---|---|
| 1,657,450 | A | | 1/1928 | Barnes | |
| D165,862 | S | * | 2/1952 | Partridge | D4/134 |
| 2,706,825 | A | * | 4/1955 | Blakeman | A46B 5/0029 15/176.4 |
| 3,065,480 | A | * | 11/1962 | Sexton | A46B 7/04 15/172 |
| D243,422 | S | * | 2/1977 | Varga | D4/104 |
| 4,165,755 | A | | 8/1979 | Cassai | |
| D255,511 | S | * | 6/1980 | Hill | D4/104 |
| 4,227,276 | A | * | 10/1980 | Ginsburg | A46B 5/00 15/167.1 |
| 4,330,896 | A | | 5/1982 | Booth | |
| 4,598,437 | A | | 7/1986 | Ernest et al. | |
| D303,323 | S | * | 9/1989 | Saunders | D4/138 |
| D336,991 | S | * | 7/1993 | Makinami | D4/104 |
| D346,902 | S | * | 5/1994 | Makinami | D4/104 |
| D357,123 | S | * | 4/1995 | Brown et al. | D4/104 |
| 5,476,334 | A | | 12/1995 | Tello-Vallarino | |
| 5,511,276 | A | | 4/1996 | Lee | |
| D373,250 | S | * | 9/1996 | Cavazza | D4/104 |
| D387,203 | S | * | 12/1997 | Matharu | D4/104 |
| 5,842,488 | A | | 12/1998 | Belleau et al. | |
| 5,881,421 | A | | 3/1999 | Ducharme | |
| 5,881,431 | A | * | 3/1999 | Pieper, II | E05D 11/06 16/374 |
| 6,039,051 | A | | 3/2000 | Dorf | |
| 6,050,273 | A | | 4/2000 | Lhuisset | |
| 6,108,847 | A | * | 8/2000 | Cueman et al. | A46B 11/00 15/104.94 |
| 6,234,798 | B1 | * | 5/2001 | Beals | A46B 5/02 15/143.1 |
| 6,315,730 | B1 | * | 11/2001 | Hoff | A61K 49/223 600/458 |
| 6,687,940 | B1 | * | 2/2004 | Gross | A46B 5/026 15/167.1 |
| 6,779,532 | B2 | * | 8/2004 | Dorf | A46B 3/10 132/200 |
| 7,182,542 | B2 | | 2/2007 | Hohlbein | |
| D589,258 | S | * | 3/2009 | Littmann et al. | D4/104 |
| 7,823,593 | B2 | | 11/2010 | Gueret | |
| 2005/0188486 | A1 | | 9/2005 | Tubman | |
| 2007/0124880 | A1 | * | 6/2007 | Petner | A46B 5/021 15/143.1 |
| 2007/0143942 | A1 | * | 6/2007 | Fox et al. | A46B 5/021 15/143.1 |

OTHER PUBLICATIONS

KR 300022366 Registered Design Bibliography, May 15, 1978, [online], [retrieved on Nov. 15, 2012] Retrieved from the Design Database of the Korean Intellectual Property Rights Information Service using Internet: <URL: http//eng.kipris.or.kr>.*

CN 301434919 Registered Design, (Qin, Bingxian) Jan. 12, 2011, [online], [retrieved on Jan. 13, 2013] Retrieved from the Questel Intellectual Property Portal Design Database using the Internet: <URL: http://www.orbit.com>.*

* cited by examiner

[Canceled]

[Canceled]

[Canceled]

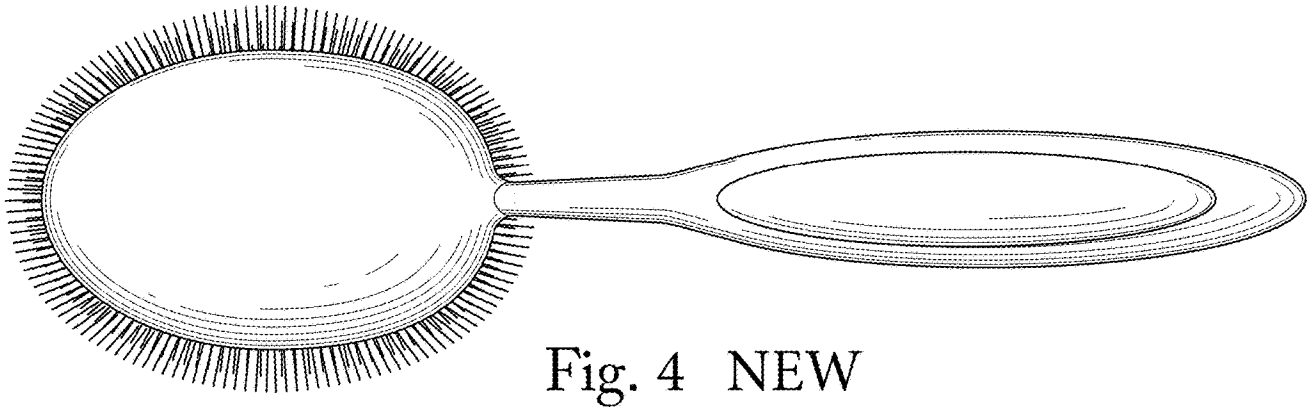
Fig. 4 NEW
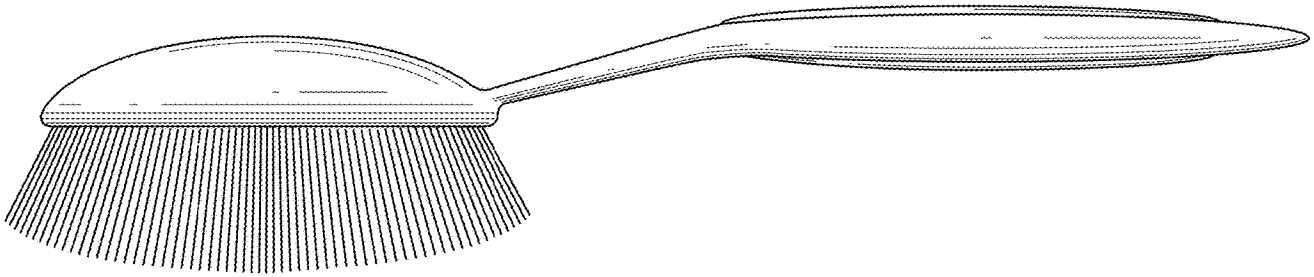
Fig. 5 NEW
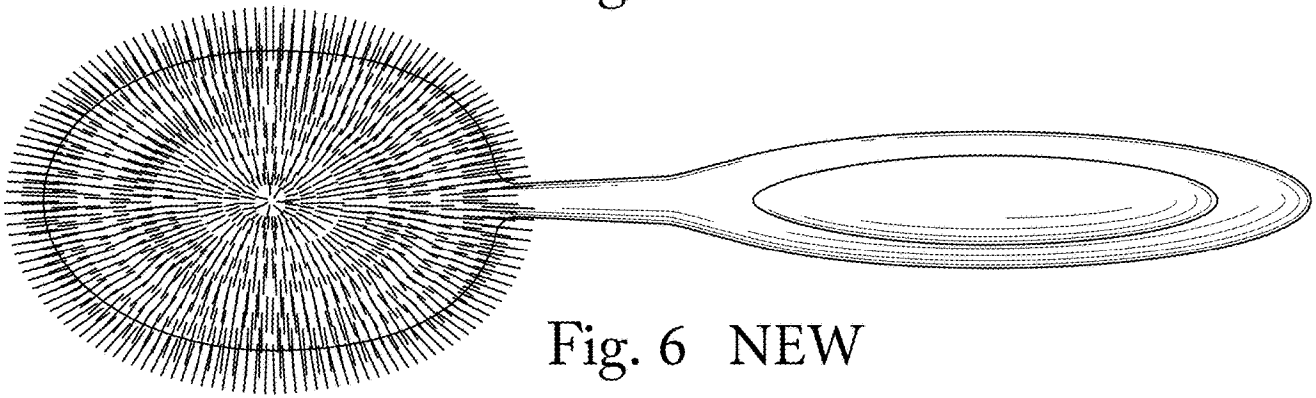
Fig. 6 NEW